United States Patent

[11] 3,613,565

| [72] | Inventor | Roger Muller<br>Neuilly sur Seine, France |
| --- | --- | --- |
| [21] | Appl. No. | 823,678 |
| [22] | Filed | May 12, 1969 |
| [45] | Patented | Oct. 19, 1971 |
| [73] | Assignee | Etablissement D. F.<br>Paris, France |

[54] APPARATUS FOR A SETTABLE WORKING MATERIAL FEED IN PRESSES IN FORM OF CYCLES
7 Claims, 3 Drawing Figs.

[52] U.S. Cl. .................................................. 100/215,
83/228, 226/141, 226/155
[51] Int. Cl. .............................................. B30b 15/30
[50] Field of Search .................................... 100/215;
83/241, 228, 244; 72/425; 226/141, 142, 137, 139,
188, 154, 155, 156

[56] References Cited
UNITED STATES PATENTS
| 1,480,044 | 1/1924 | Bowers et al. ............... | 83/228 |
| --- | --- | --- | --- |
| 2,268,242 | 12/1941 | Candee et al. ................ | 83/228 X |
| 2,357,557 | 9/1944 | Sherman et al. .............. | 83/228 X |
| 2,466,436 | 4/1949 | Jones ........................... | 83/228 |
| 3,115,999 | 12/1963 | Wythe .......................... | 226/154 X |

Primary Examiner—Billy J. Wilhite
Attorney—Ernest G. Montague

ABSTRACT: An apparatus for a timed, settable working material feed in presses with a stepwise driven pair of first feeding rollers by the press by means of a step-by-step switching device, wherein the first feeding rollers grip the working material in a clamping manner. A first change gear drive having a coarse setting step and a correction- or fine-setting step is provided. The step-by-step switching device is operatively connected with the pair of the first feeding rollers by means of the change gear device. A pair of second feeding rollers, is also arranged and a second change gear drive for the pair of second feeding rollers, is provided. The first change gear drive is operatively connected with the second change gear drive, and the pair of second feeding rollers is disposed on the side of the apparatus opposite that of the pair of the first feeding rollers.

3,613,565

APPARATUS FOR A SETTABLE WORKING MATERIAL FEED IN PRESSES IN FORM OF CYCLES

The present invention relates to an apparatus for a timed, settable working material feed in presses with feeding rollers driven by the press by means of a step-by-step switching device, which feeding rollers grip the working material in a clamping manner, in which the step-by-step switching device is operatively connected with the feeding rollers by means of a change gear transmission with a coarse setting step, as well as a further correction or fine-setting step.

For a great number of operations, it is required to equip the press with two feeding devices disposed on oppositely disposed sides of the press stand, for instance with feeding rollers. Such measure can, for instance, be required, in order to be able to produce, in case of a feed of heavy sheet metal and in case of large feeding steps, the necessary clamping or friction connection. Also, in connection with a very high working speed, that means also in case of a great number of strokes, the use of two pairs of feeding rollers alone for reasons for control of the mass forces of the working material moved by the feed is of advantage. Yet, even then, when all these considerations are taken aside, there exist examples for the fact that it is of advantage, if not by all means necessary, to use a second pair of feed rollers. This case presents itself, for instance, if the work is done with a comparatively thin working material, and if this working material is inclined to lift itself from the tool or another base. Here, it is necessary to stretch the working material between the two pairs of feeding rollers by corresponding exertion of a pulling force, and thereby to retain it in a defined nonobjectionable position relative to the tool.

The use of two feed units is not new in connection with presses. Until now, these two feed units were formed, however, as independently driven devices, which derive the required driving force from the main shaft of the press. By such arrangement, not only a very large structure results, rather also a mostly unsatisfactory working operation is obtained. If, namely, as until now, the exact feed could be set by reducing the diameter of the feed rollers only by polishing until the correct feed is brought about, then always in this manner only the exact feed for a single operation can be obtained. If for another operation, another feed length is required, then new feed rollers must be adjusted again in the complicated and expensive manner of polishing. It is apparent that such procedure is not only expensive but also time consuming and an economical operation is rendered impossible. By this, it is to be taken into consideration, that the feed rollers due to the high wear during the operation are produced of very high value working material or at least with such working material, for instance, applied with hard metal layers. By this arrangement not only high material costs result, because for each working program a pair of rollers must be held in store, but also high working expenses. The working of hard metal surfaces is known to be extremely difficult.

The setting of a predetermined feed of the working material took place, until now, even then in the described manner, if the press was equipped only with one feeding unit. In the copending U. S. Pat. application Ser. No. 739,762, filed June 25, 1968, a way has been shown, which makes it possible, to avoid these appreciable drawbacks. In accordance with the previously mentioned device, the feed can be set with very high precision nearly without steps, if the drive of the feeding rollers, which do not have to be held in storage any more in accordance with the present invention, takes place by means of a change gear drive, which receives its driving force from a step-by-step switching device driven by the main shaft of the press. The change gear drive has, in accordance with the present invention, a coarse setting step, as well as a correction or fine-setting step.

It is possible to drive in this manner also the second pair of feeding rollers of a press. This would mean, however, that for the second pair of feeding rollers a step switching device with change gear drive, and other not mentioned material must be provided An undesirably great structural requirement and high price would result. Furthermore, the feed must be set with two change gear drives, that means relative to a machine with only a single feeding roller unit, double the setting time is now required.

It is one object of the present invention to provide an apparatus for a timed, settable working material feed in presses, wherein the mentioned drawback can be avoided, if in the apparatus disclosed in said copending U.S. Pat. application Ser. No. 739,762, the change gear drive of the feed rollers is operatively connected with the change gear drive of an additional pair of feeding rollers, which additional pair of feeding rollers is disposed on the side of the machine opposite that carrying the first pair of feeding rollers.

In accordance with the present invention, the exact work material stroke and the exactly measured drive value for obtaining this feed, respectively, is provided for both pairs of feeding rollers disposed on opposite sides of the machine stand from one and the same driving device which is present anyhow for the feed. This means that only one single step-by-step switching drive and only a single change gear drive consisting of a coarse-setting step and a fine-setting step is required in order to drive exactly both pairs of feeding rollers.

In case of variations of the feeding stroke it is merely necessary to set or adjust correspondingly one device only, namely the change gear drive, in order to set in this manner the drive value for both pairs of feeding rollers in the required manner. Thus, relative to the known devices an appreciable drop of the structural and working requirements results.

For very high exactness, as well as for compensation of unavoidable tolerances, but also for a predetermined already mentioned work, it is of advantage, if the driving value of the first pair of feeding rollers can be varied in predetermined manner relative to that of the second pair of feeding rollers, or vice versa. In a further embodiment of the device, thus, a change gear drive (fine setting step) is directly preset to the second pair of feeding rollers.

During a suitable performance of the new apparatus, a shaft mounted in a horizontal position rotatably on the stand above the range assumed by the tool serves for the operative connection. The shaft is connected at each of its ends with a bevelled gear drive, which is connected with the drive gear of the coordinated pair of feeding rollers by means of a universal shaft.

During working with progressive dies it is unavoidable, for instance, to provide that after a performed stroke, the working material can perform slight correction displacements. By this arrangement, it is possible that catching pins provided in the working material can enter in corresponding catch bores of the working material band, and thereby the precise centering of the working material to the cut is brought about caused by slight displacement movements of the working material. In the already mentioned apparatus disclosed in said copending U.S. Pat. application Ser. No. 739,762, the feeding rollers can be lifted for this purpose relative to each other, that means they are aired. From this airing movement only one of the cooperating rollers, preferably the upper roller, is concerned, so that the clamping connection with which these rollers grip the working material band is timely limited released.

In a further suitable development of the new apparatus, the upper roller of the second pair of feeding rollers is mounted for movement as to height and a cam disc with settable angular position and settable can angle $\sphericalangle \alpha$ is provided which is continuously driven by the machine and serves the lifting of the counter roller independently from the pair of input rollers.

By this arrangement of the new device, it is possible also to form the second pair of feeding rollers to be capable of being aired. In this case additionally, care has been taken, that the moment of the airing is selected at will independently from the moment of the airing of the first pair of feeding rollers, as the possibility exists, to set the duration of the airing of the second pair of feeding rollers independently from that of the first one. Accordingly, the setting of these values in the second pair of feeding rollers can be expanded such, that the second pair of feeding rollers, in case of extreme setting in one direction does not lead any more to the performance of the airing movement and in the other extreme direction does not return any more into the clamping position respectively. The last-mentioned setting is identical with the putting out of operation of the second pair of feeding rollers.

With these and other objects in view, which will become apparent in the following detailed description, the present invention, which is shown by example only, will be clearly understood in connection with the accompanying drawings, in which.

Figure 1:
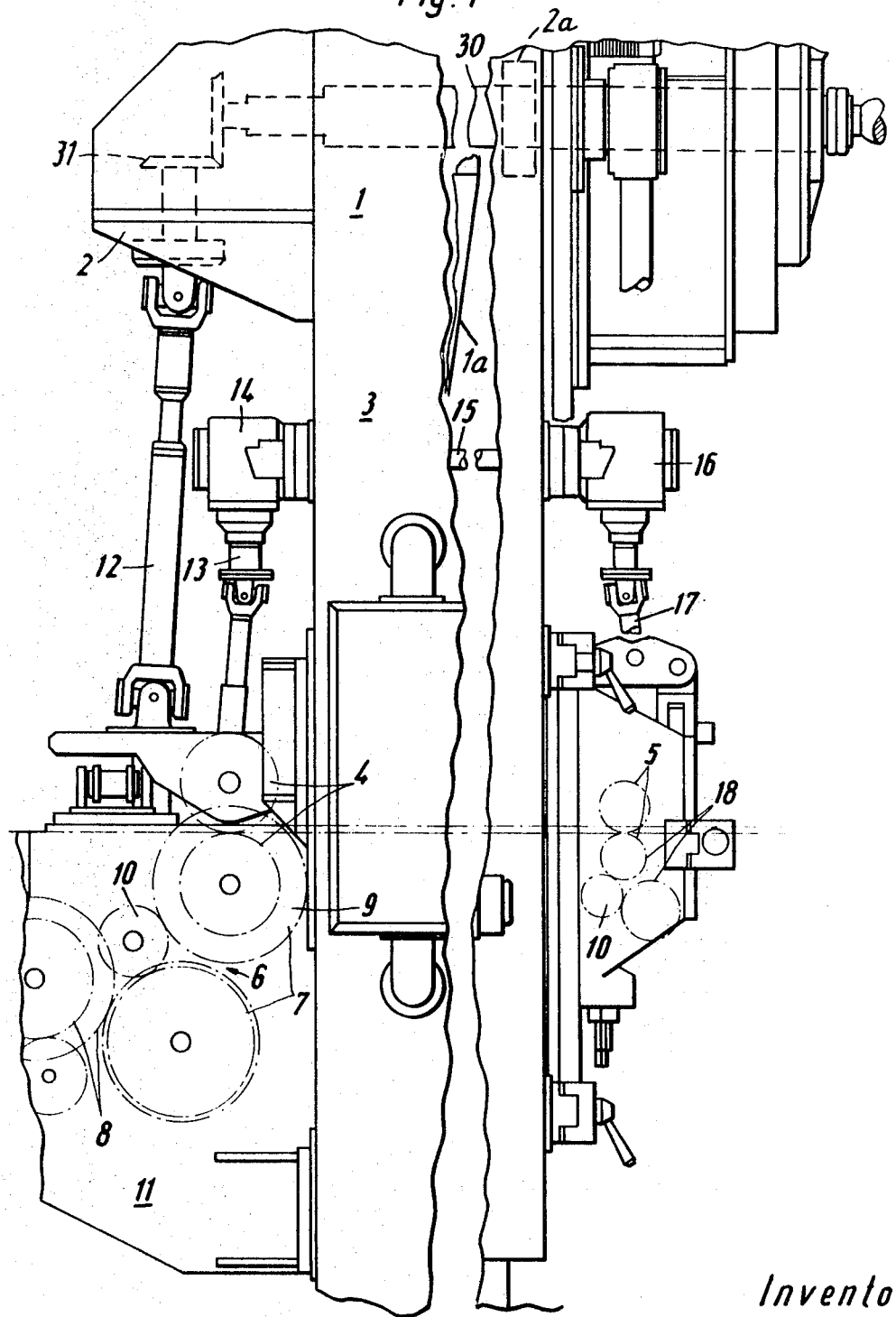
FIG. 1 is an elevation of the two outer side parts of the stand of a press with only partly indicated head and the machine foot being united for the purpose of simplification of the showing, in a position moved towards each other and with a device for timed, settable working material feed.

Referring now to the drawings, and in particular to FIG. 1, a press 1 is disclosed. The latter has a driving head 2 in which the driving force of preferably an electromotor 2a is transformed into reciprocating movements of a ram 1a by any conventional means (not shown), which ram is guided in a stand 3 for height adjustment. In FIG. 1, only the two oppositely disposed outer edges of the stand 3 are shown. In the stand 3 there is provided a hollow space for receiving a tool. The movement of the working material is performed in the press shown in FIG. 1 by a device, which includes a first pair of feeding rollers 4 and a second pair of feeding rollers 5. The two pairs of feeding rollers 4 and 5 are disposed on oppositely disposed sides of the machine stand 3. They permit selectively simultaneously or alternately to be put into or out of operation.

The first pair of feeding rollers 4 obtains its driving force from a change gear drive 6 which comprises a correction or finesetting step 7, as well as a coarse setting step 8. A gear 10 which is eccentrically mounted, belongs to the fine setting step and serves simultaneously for compensation of the different gear diameters. The change gear drive 6 is driven in turn by a step-by-step switching mechanism 11, which transforms by means of a universal shaft 12 a continuous rotary movement derived from the driving head 2 by a drive means 2a which rotates a shaft 30 which in turn rotates the universal shaft 12 via an angle drive 31 into step movements and rotary steps, respectively, which rotary movement is fed to the change gear drive 6.

With the drive gear 9 of the fine-setting step are connected coupling gears which take care of the feature, that the two feeding rollers 4 of the first pair of feeding rollers are moved relative to each other in the proper direction of rotation, and they even then remain in operative relative engagement, if the feeding rollers 4 lift up relative to each other.

A braking device at the upper roller and the lower roller for equalization of the mass forces, as well as for the compensation of gear air, the means for rendering possible the airing of the rollers of the first pair of feeding rollers have been already described in connection with said copending U.S. Pat. application, Ser. No. 739,762, so that a repetition is not required here.

A second pair of feeding rollers 5 is connected with the driving gear 9 of the first pair of feeding rollers 4 by means of a universal shaft 13, a bevelled gear drive 14, a shaft 15 extending crosswise to the stand 3 at about the level of the driving head 2, a further bevelled gear drive 16 and another universal shaft 17. The driving force of the universal shaft 17 is transmitted to a change gear drive 18, which consists exclusively of a fine-setting step, by means of coupling gears 19, which, as in the first pair of feeding rollers, serve the purpose of driving the second feeding rollers in the correct direction of rotation relative to each other and the operative engagement is maintained also during airing of the rollers.

The structure of this fine-setting step 18, as well as of the coupling gear step 19 for driving the second pair of feeding rollers 5 corresponds with the structure of the equivalent drive steps for driving the first pair of feeding rollers 4. A detailed explanation of this feature can, therefore, be omitted. It is merely required to mention, that the diameter of the rollers of the second pair of feeding rollers 5 can deviate from the diameter of the rollers of the first pair of feeding rollers 4, if, on the way of the drive connection of these two pairs of rollers, a corresponding transmission factor with equalizing increasing or reducing transmission ratio is built in. If, however, the drive transmission of the drive connection between the two pairs of feeding rollers 4 and 5 equals 1:1, , then an equal diameter of the rollers of the two pairs of feeding rollers is required.

Figure 2:
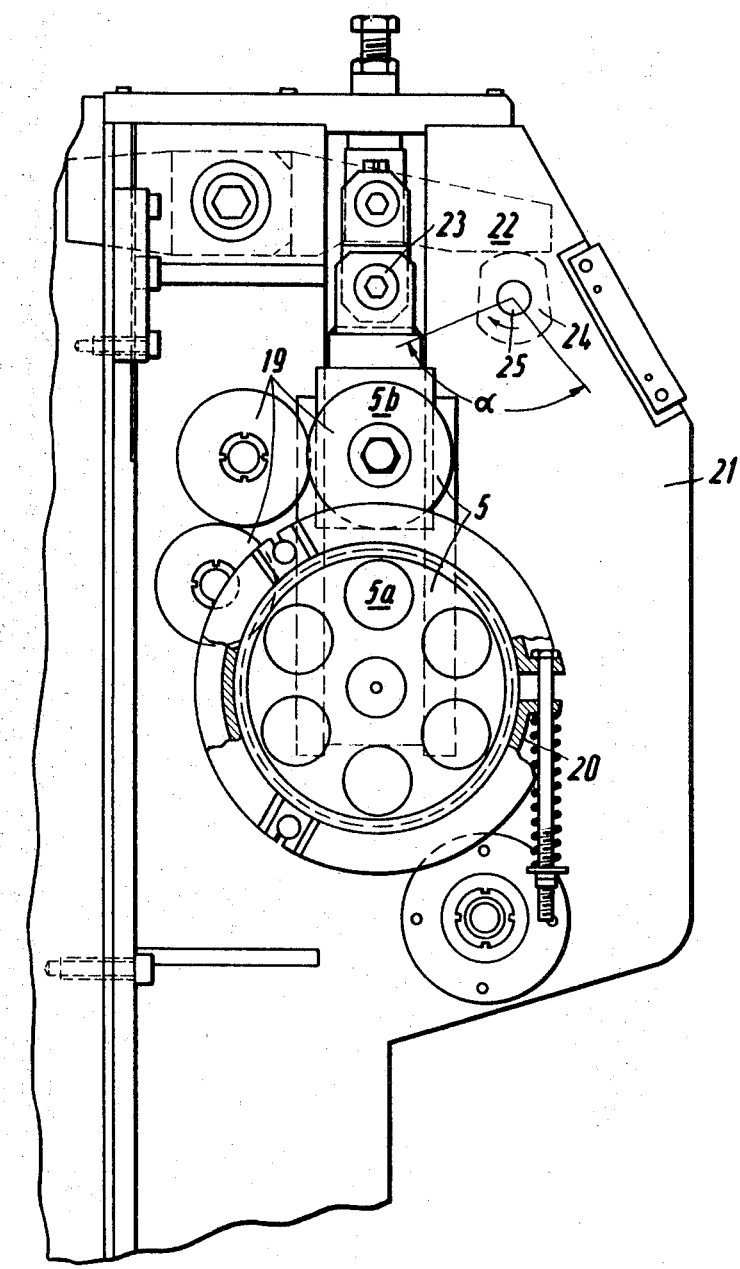
FIG. 2 is a side elevation, partly in section, of the housing and of the drive for mounting and driving driving the second pair of feeding rollers.

Referring now to FIG. 2, it can be recognized that the rollers of the second pair of feeding rollers 5 can have, under circumstances, also a different diameter. It is suitable, if the two rollers 5a and 5b, as it is also the case in connection with the corresponding roller of the first pair of feeding rollers 4, are equipped with a braking device 20. The upper feeding roller 5b is movable as to its height in a suitable housing 21. Vertical movements of the upper feeding roller 5b of the second pair of feeding rollers are produced by means of a swinging arm 22 which engages on bearing legs 23, on which bearing legs the upper feeding roller 5b is mounted. The arm 22 is disposed against one end of a cam disc 24 which is driven within the cycle of the machine 1 in suitable manner. The cam disc 24 has a cam 25 adjustable to different lengths (angle $\sphericalangle \alpha$). Based on this adjustability, the upper roller 5b of the second pair of feeding rollers 5 can be lifted from the lower feeding roller 5a constantly or also with the smallest possible adjustment ($\alpha=0$) in a permanent clamping connection and engagement contact respectively, with the lower roller 5a. Furthermore, the moment and the duration of the lifting is thereby adjustable.

By the described formation of the device, it is possible, to set simultaneously the feeding length for both pairs of feeding rollers by setting of the coarse and fine-setting steps 7 and 8, respectively, of the change gear drive 6. The fine setting step 18 of the drive for the second pair of feeding rollers 5 is to be adjusted only then if certain corrections have to be performed, or particular working conditions are required therefor.

Figure 3:
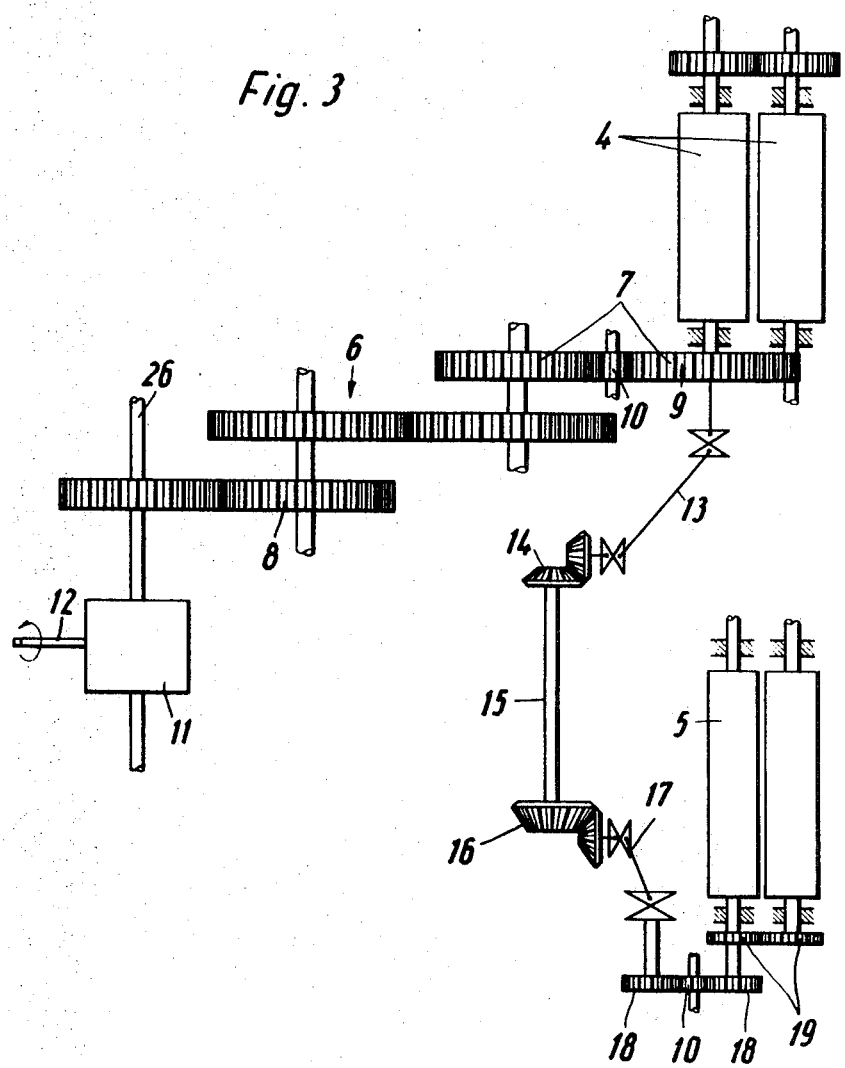
FIG. 3 is a schematic showing of the drive of a device.

In FIG. 3 a drive of the new feeding device is disclosed schematically. The driving force initiated from the universal shaft 12 into the stepwise operating switching device 11 (Ferguson drive) in form of a continuous rotary movement, is fed to a drive shaft 26 in form of rotary steps. The shaft 26 drives the already mentioned first or coarse-setting step 8 of the change gear drive 6. This coarse-setting step 8 serves, in turn, for driving a fine or correction-setting step 7. Its driving force is transmitted by means of the mentioned intermediate gear 10 of likewise mentioned coupling gear, particularly, however, the driving gear 9 for the rollers of the first pair of feeding rollers 4. Connected to this drive gear 9 is the previously mentioned universal shaft 13, the beveled gear drive 14, the shaft 15, the second beveled gear drive 16, as well as the previously mentioned universal shaft 17. The fine-setting step 18 is driven from the universal shaft 17 which fine-setting step 18 transmits its driving force directly to the rollers 5 of the second pair of feeding rollers.

While I have disclosed several embodiments of the present invention, it is to be understood that these embodiments are given by example only and not in a limiting sense.

I claim:

1. In a press having an upstanding stand, an apparatus for performing a timed, settable working material feed for said press, said press having a ram, and at least one drive means for said ram and said feed apparatus, said feed apparatus comprising a first pair of stepwise driven feeding rollers mounted on one side of said stand and a second pair of feeding rollers on the other side of said stand, intermediate drive means for said feed rollers, comprising a first change gear drive having a coarse-setting step to selectively set the amount of a basic feed and a correction or finersetting step to selectively provide a fine adjustment of said basic feed, said step-by-step switching device operatively connected with said pair of said first feeding rollers by means of said first change gear drive, a second change gear drive for said pair of second feeding rollers, and said first change gear drive being operatively connected with said second change gear drive.

2. The apparatus, as set forth in claim 1, wherein said second change gear drive is disposed directly preceding said pair of second feeding rollers.

3. The apparatus, as set forth in claim 1, which includes a shaft rotatably mounted on said stand in horizontal position within a range above said rollers, for operative connection of said pairs of feeding rollers, a bevelled gear drive coordinated to and operatively connected with the respective ends of said shaft, a universal shaft, and a drive gear coordinated to the corresponding pair of said feeding rollers by means of said universal shaft.

4. The apparatus, as set forth in claim 1, wherein said pair of said second feeding rollers include an upper roller mounted for moving to a given height, and a cam disc continuously driven by said apparatus and including means for adjusting its angular position and connected for adjusting said cam disc for lifting said upper roller independently from said pair of said first feeding rollers.

5. The apparatus as set forth in claim 1, wherein said second change gear drive comprises exclusively a second fine-setting step.

6. The apparatus, as set forth in claim 1, wherein said step-by-step switching device is connected with said coarse setting step by means of said first change gear drive, and said coarse setting step is operatively connected with said pair of said first feeding rollers by means of said correction or fine-setting step.

7. The apparatus, as set forth in claim 6, wherein said second change gear drive is operatively connected from said correction or fine-setting step of said first change gear drive.